(No Model.)
W. M. KIDDIE.
AUTOMATIC LIQUID ELEVATING APPARATUS.
No. 575,355. Patented Jan. 19, 1897.
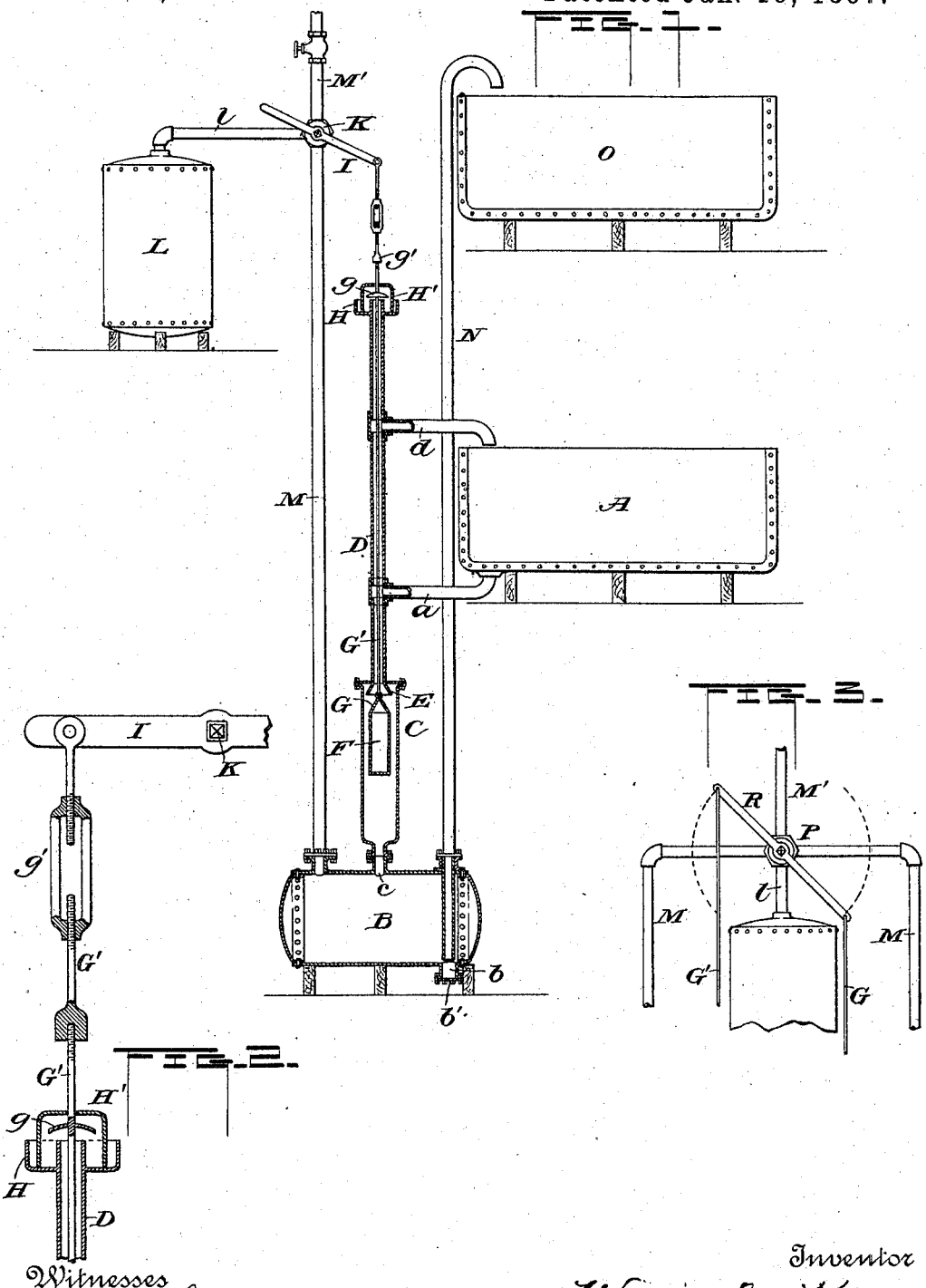
Witnesses
C. W. Smith
M. A. Dillon
Inventor
William M. Kiddie
By Geo. T. Whittaker
Attorney

UNITED STATES PATENT OFFICE.

WILLIAM M. KIDDIE, OF CLIFTON, ARIZONA TERRITORY.

AUTOMATIC LIQUID-ELEVATING APPARATUS.

SPECIFICATION forming part of Letters Patent No. 575,355, dated January 19, 1897.

Application filed December 23, 1895. Serial No. 573,032. (No model.)

*To all whom it may concern:*

Be it known that I, WILLIAM M. KIDDIE, a citizen of Great Britain, residing at Clifton, in the county of Graham and Territory of Arizona, have invented certain new and useful Improvements in Automatic Liquid-Elevating Apparatus; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in apparatus for pumping liquids, such as chemical solutions, oils, acids, corrosive liquids, water, and the like. It has been designed especially for the handling of copper liquors in a leaching-plant.

The invention consists, briefly, in a chamber or receiver connected with the supply-tank by a pipe controlled by a float-valve which operates not only to cut off the liquid when the chamber is full, but also to turn on a supply of compressed air by means of which the liquid is expelled from the chamber into a receiving-vat. This operation is repeated automatically so long as the supplies of liquid and compressed air are kept up.

In the drawings, Figure 1 is a diagrammatic view of an apparatus embodying my invention. Fig. 2 is a detail showing the lute for the supply-pipe. Fig. 3 is a detail of a modified air-valve for supplying two pumps.

The liquid to be pumped is contained in any suitable tank, reservoir, or vat A. At a suitable distance below said tank is the receiver B, preferably a cylindrical vessel with convex ends, provided with a cleaning-pipe $b$ in its bottom, closed in any suitable manner, as by a plate $b'$. Just above the receiver is an upright chamber C, communicating at its lower end with the receiver by a pipe $c$ and at its upper end with the tank A by the vertical pipe D and branch pipe $a$. At the point where the pipe D enters the chamber there is an annular valve-seat E, preferably conical, as shown. Within the chamber is a float F, being an inverted vessel or cup, carrying at its top a check-valve G, adapted to close against the seat E.

The pipe D rises to a point considerably above the tank A. Its upper end is surrounded by a water seal or lute formed by a cup H, the bottom of which is somewhat below the end of the pipe. A deeply-flanged cover H' is held in the top H, the flange resting on the bottom of the cup around the pipe D, thereby preventing any liquid escaping out of the top of the pipe in case of any accident to the valve.

A valve-rod G' is attached to the float and rises through the pipe D and through a hole in the cover H'. Attached to this rod just inside the cover is a concave or conical collar $g$, somewhat larger than the diameter of the pipe D, to prevent the liquid from being splashed through the hole in the cover in case of a leak at the valve-seat. A branch pipe $d$ serves to convey back to the tank A any liquid accidentally forced up into the pipe D. The valve-rod is connected with a lever I, attached to the stem of a three-way cock K, which controls the flow of compressed air from a reservoir L. The air is led to the cock by a pipe $l$, and in one position of the cock it can pass thence through a pipe M to the receiver B. When the cock is reversed, the air can escape from the receiver through the exhaust-pipe M'. A turnbuckle $g'$, interpolated in the rod G', enables the valve G and the three-way cock to be properly adjusted. A delivery-pipe N leads from near the bottom of the receiver B to the receiving-tank O.

The operation of my apparatus is as follows: The liquid passes from the tank A into the receiver B until the latter is full. The liquid then backs up into the valve-chamber C, raising the float F and closing the valve G against the seat E. This shuts off the supply of liquid and at the same time opens the air-cock K, admitting compressed air to the receiver. The air forces the liquid out of the receiver through the delivery-pipe N. The air-pressure holds the valve G closed until the receiver is empty, when the pressure is released by the escape of air through the delivery-pipe N. The valve and float then drop, by reason of the weight of the liquid above them in the pipe D, thereby shifting the cock K, which cuts off the air-supply and opens the exhaust. The receiver now fills with liquid again and the operation is repeated.

The action of the apparatus is automatic and is kept up so long as the supply of liquid and compressed air is maintained, the discharge being intermittent and its rapidity depending upon the size of the receiver and the pipes and the pressure of the air.

In case a constant discharge is required, two pumps can be set side by side and connected with a common delivery-pipe. The air-cocks can be connected so as to work alternately, or a four-way cock P can be used, as shown in Fig. 3.

The lever R for operating the cock is double, one arm being connected with the valve-rod of one pump and the other arm with the valve-rod of the other pump. When one pump is discharging, the other will be filling, and vice versa.

Having thus described my invention, what I claim, and desire to secure by Letters Patent, is—

1. In an apparatus for pumping liquids, the combination with a closed receiver, of an upright pipe connected therewith and rising above the source of supply and having an open upper end, a water seal or lute at said upper end of the pipe, a branch pipe connecting said upright pipe with the source of supply, and an overflow-pipe leading from said upright pipe back to the supply source from a point below the lute, substantially as described.

2. In an apparatus for pumping liquids, the combination with a closed receiver, of an upright pipe connected therewith and open at its upper end, a source of supply communicating with said pipe, a water seal or lute at the upper end of said pipe, a check-valve controlling the lower end of said pipe, a valve-rod rising through said pipe, and the cover of the lute, a collar on the rod within the cover, and a compressed-air supply for said receiver controlled by said rod, substantially as described.

3. An apparatus for pumping liquids, comprising a closed receiver, a valve-chamber rising from the upper part of the same, an upright supply-pipe rising above the valve-chamber to a point above the source of supply and having its upper end opening upwardly, a conical valve-seat at the lower end of said pipe within the valve-chamber, a conical float-valve in the chamber adapted to close against said seat, a delivery-pipe leading from the lower part of said receiver to an elevated receiving-tank, a source of compressed air, an air-pipe having one end open and the other end entering the top of the receiver, a branch pipe connecting said pipe with the source of compressed air, a three-way cock at the junction of the branch and main air-pipes, controlling the flow of compressed air into the receiver, and its escape through the same pipe into the open air, a rod attached to the float-valve and rising through and above the open supply-pipe to a point of attachment with the three-way cock, and a turnbuckle in said rod to permit relative adjustment of such valve and cock, substantially as described.

In testimony whereof I affix my signature in presence of two witnesses.

WILLIAM M. KIDDIE.

Witnesses:
ALEXANDER VEITCH,
J. D. AUDLEY SMITH.